Figure 1:
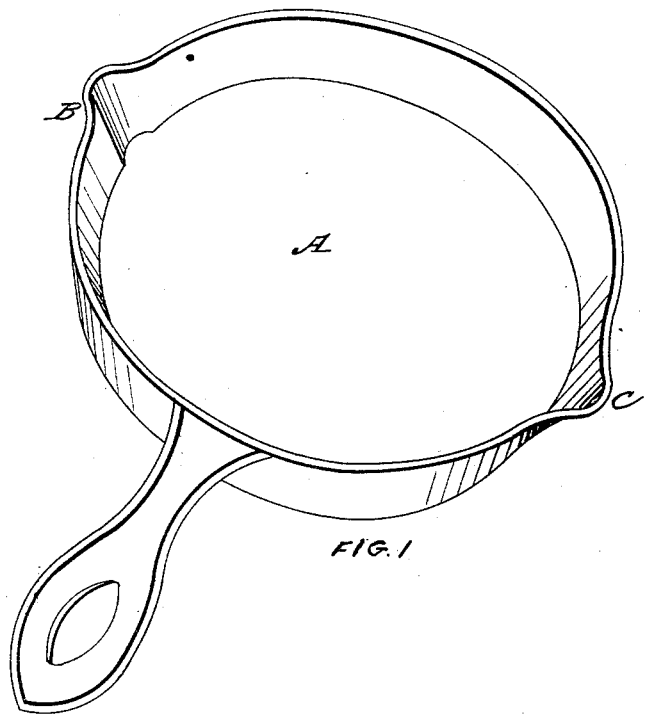

A. B. FALES.
Frying Pan.

No. 67,517.

Patented Aug. 6, 1867.

WITNESSES:
E. Carver
Charles D. Kellum

INVENTOR:
Andrew B. Fales

United States Patent Office.

ANDREW B. FALES, OF TROY, NEW YORK.

Letters Patent No. 67,517, dated August 6, 1867.

IMPROVEMENT IN SPIDERS OR FRYING-PANS.

*The Schedule referred to in these Letters Patent and making part of the same.*

TO ALL WHOM IT MAY CONCERN:

Be it known that I, ANDREW B. FALES, of the city of Troy, in the county of Rensselaer, and State of New York, have invented a new and improved "Spider;" and I do hereby declare that the following is a full, clear, and exact description of the same, reference being hereby had to the accompanying drawings, which form and make a part of this specification.

Like letters represent and refer to like or corresponding parts.

Figure 1 is a perspective view of a spider containing my invention and improvements hereinafter described and set forth.

Heretofore spiders have been made with only one lip, so that the contents can be poured out only on one side, while it is frequently convenient to pour out on the side opposite the lip; besides some dealers are in the habit of purchasing spiders with lips on the right side only, while other dealers demand them with the lip on the left side, so that the manufacturer frequently finds himself unable to fill an order, by reason of having no spiders with the lip on the side ordered.

The object of my invention is to obviate these difficulties. Therefore the nature of my invention consists in casting a spider with two lips, on opposite sides of said spider, substantially in the manner and for the purposes herein described and set forth.

A spider containing my invention is constructed in the same manner as those heretofore made, except that it is cast with two lips, one on each side and opposite to each other, for the purposes above mentioned. My invention may also be applied to stew-pans and other cooking utensils of like character. It is not, of course, necessary that the lips should be exactly opposite each other, or that only two should be used; for instance, the spider may be made with three lips, one in front, in addition to those on the side.

Having thus described the nature of my said invention, what I claim as my invention, and desire to secure by Letters Patent, is—

I claim as a new article of manufacture, a spider constructed substantially in the manner and for the purposes herein described and set forth.

In testimony whereof I have hereunto set my hand this 30th day of April, 1867.

ANDREW B. FALES.

Witnesses:
CHARLES D. KELLUM,
E. COWEN.